United States Patent
Xiong et al.

(10) Patent No.: US 10,834,383 B2
(45) Date of Patent: Nov. 10, 2020

(54) METHOD AND APPARATUS FOR IMPLEMENTING VIDEO QUALITY ASSESSMENT OF A GOP

(71) Applicant: HUAWEI TECHNOLOGIES CO., LTD., Shenzhen (CN)

(72) Inventors: Jie Xiong, Nanjing (CN); Youqing Yang, Shenzhen (CN); Yihong Huang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/283,728

(22) Filed: Feb. 22, 2019

(65) Prior Publication Data
US 2019/0191152 A1    Jun. 20, 2019

Related U.S. Application Data

(63) Continuation of application No. PCT/CN2017/098487, filed on Aug. 22, 2017.

(30) Foreign Application Priority Data

Aug. 23, 2016   (CN) .......................... 2016 1 0709417

(51) Int. Cl.
| | |
|---|---|
| *H04N 7/12* | (2006.01) |
| *H04N 17/04* | (2006.01) |
| *H04N 21/44* | (2011.01) |
| *H04N 19/114* | (2014.01) |
| *H04N 19/154* | (2014.01) |
| *H04N 17/00* | (2006.01) |

(52) U.S. Cl.
CPC .......... *H04N 17/04* (2013.01); *H04N 17/004* (2013.01); *H04N 19/114* (2014.11); *H04N 19/154* (2014.11); *H04N 21/44* (2013.01)

(58) Field of Classification Search
CPC .......................... H04N 19/114; H04N 19/154
See application file for complete search history.

(56) References Cited

U.S. PATENT DOCUMENTS

| | | |
|---|---|---|
| 8,531,531 B2 | 9/2013 | Raake et al. |
| 2007/0014364 A1 | 1/2007 | Kue-Hwan |

(Continued)

FOREIGN PATENT DOCUMENTS

| | | |
|---|---|---|
| CN | 101296166 A | 10/2008 |
| CN | 101626506 A | 1/2010 |

(Continued)

OTHER PUBLICATIONS

Liu Hechao et al, No-reference video quality assessment over the IP network based on packet loss. Journal of Xidian University, vol. 39, No. 2, Apr. 2012, 6 pages.

(Continued)

*Primary Examiner* — Young Lee
(74) *Attorney, Agent, or Firm* — Kilpatrick Townsend & Stockton LLP

(57) ABSTRACT

When video quality is assessed, a proportion of a damaged data caused by packet loss in a video frame in which the damaged data is located is considered, and other factors are also considered, such as a position of the damaged data in the video frame and impact of a scene in which the video frame is located on the video frame or a video frame located after the video frame. Therefore, accuracy of quality assessment is higher.

6 Claims, 7 Drawing Sheets

(56) References Cited

U.S. PATENT DOCUMENTS

| | | |
|---|---|---|
| 2012/0212624 A1 | 8/2012 | Yang et al. |
| 2013/0265445 A1 | 10/2013 | Argyropoulos et al. |
| 2013/0314553 A1 | 11/2013 | Sun et al. |
| 2014/0037016 A1 | 2/2014 | Qingpeng et al. |

FOREIGN PATENT DOCUMENTS

| | | | |
|---|---|---|---|
| CN | 102056004 | A | 5/2011 |
| CN | 102740108 | A | 10/2012 |
| CN | 103270765 | A | 8/2013 |
| CN | 103647963 | A | 3/2014 |
| EP | 2482558 | A1 | 8/2012 |
| JP | 2009188674 | A | 8/2009 |
| WO | 2011054254 | A1 | 5/2011 |
| WO | 2012076202 | A1 | 6/2012 |

OTHER PUBLICATIONS

ITU-T P.1201.2, Series P: Terminals and Subjective and Objective Assessment Methods, Models and tools for quality assessment of streamed media, Parametric non-intrusive assessment of audiovisual media streaming quality—Higher resolution application area. Oct. 2012, 56 pages.

ITU-T P.1202.2, Series P: Terminals and Subjective and Objective Assessment Methods, Models and tools for quality assessment of streamed media, Parametric non-intrusive bitstream assessment of video media streaming quality—Higher resolution application area. May 2013, 64 pages.

ITU-T H.264, Series H: Audiovisual and Multimedia Systems Infrastructure of audiovisual services—Coding of moving video, Advanced video coding for generic audiovisual services. Feb. 2016, 807 pages.

ITU-T H.265, Series H: Audiovisual and Multimedia Systems, Infrastructure of audiovisual services—Coding of moving video, High efficiency video coding. Apr. 2015, 634 pages.

METHOD AND APPARATUS FOR IMPLEMENTING VIDEO QUALITY ASSESSMENT OF A GOP

CROSS-REFERENCE TO RELATED APPLICATIONS

This application is a continuation of International Application No. PCT/CN2017/098487, filed on Aug. 22, 2017, which claims priority to Chinese Patent Application No. 201610709417.4, filed on Aug. 23, 2016. The disclosures of the aforementioned applications are hereby incorporated by reference in their entireties.

TECHNICAL FIELD

The present invention relates to the field of video technologies, and in particular, to a method, an apparatus, and a system for implementing video quality assessment.

BACKGROUND

With the advent of the multimedia information era, various video processing and video communications technologies are emerging continuously, and therefore a video quality assessment technology becomes increasingly important.

With the development of communications technologies, video services such as Internet Protocol television (IPTV) and over the top (Over The Top, OTT) are being widely commercially used. To ensure quality of video services, video quality needs to be assessed, so that corresponding adjustment measures can be taken in time to ensure normal running of the video services. Therefore, how to accurately assess video quality has become an important problem that needs to be resolved urgently.

During video quality assessment, impact caused by packet loss is a key element that needs to be considered. In an IPTV monitoring solution provided in ITU-T Recommendation P1201.2, a method used during video quality assessment is calculating a proportion of damaged data caused by packet loss in a video frame in which the damaged data is located, and determining, by using the proportion, an impact degree caused by the packet loss. A larger proportion indicates a higher impact degree.

However, the foregoing method considers only the proportion of the damaged data caused by the packet loss in the video frame in which the damaged data is located. Consequently, accuracy of an assessment result is not high.

SUMMARY

Embodiments of the present invention provide a method, an apparatus, and a system for implementing video quality assessment, so as to resolve a prior-art problem that a video quality assessment result is inaccurate.

According to a first aspect, a method for implementing video quality assessment is provided, where the method includes:

determining that a first data packet in a plurality of data packets that are used to encapsulate a first video frame is lost;

obtaining a quality deterioration value of the first video frame by calculating a proportion of damaged data in the first video frame, where the damaged data includes image data affected by loss of the first data packet in the first video frame;

determining whether the first video frame is a scene change frame; and when it is determined that the first video frame is not a scene change frame, correcting the quality deterioration value of the first video frame based on a scene in which the first video frame is located.

According to the method provided in the first aspect of the present invention, during video quality assessment, the proportion of the damaged data caused by packet loss in the video frame in which the damaged data is located is considered, and impact of the scene in which the video frame is located on the video frame is also considered. Therefore, accuracy of quality assessment is higher.

In a first possible implementation of the first aspect, specifically, the quality deterioration value of the first video frame may be corrected by using a formula $xlec=\beta*xlel$, where $xlel$ is a quality deterioration value obtained before being corrected based on the scene, $xlec$ is a quality deterioration value obtained after being corrected based on the scene, $\beta$ is used to represent scene complexity of the scene in which the first video frame is located, a value of $\beta$ is greater than 0 and less than 1, a larger value of $\beta$ indicates higher complexity of the scene, and a smaller value of $\beta$ indicates lower complexity of the scene.

According to this implementation, impact of the scene complexity of the scene in which the first video frame is located on the quality deterioration value is specifically considered, thereby further improving accuracy of quality assessment.

Specifically, $\beta$ may be calculated by using a formula $\beta=g(tcomp)$, where $tcomp$ is time complexity of the scene in which the first video frame is located. A larger value of $tcomp$ indicates a larger value of $\beta$ obtained through calculation by using the function $g(\ )$, and a smaller value of $tcomp$ indicates a smaller value of $\beta$ obtained through calculation by using the function $g(\ )$.

The time complexity $tcomp$ of the scene is used to represent a degree of correlation between adjacent video frames in the scene. Higher time complexity indicates a weaker correlation, and lower time complexity indicates a stronger correlation. The time complexity represents a degree of correlation between adjacent video frames in the scene. Therefore, the scene complexity may be effectively reflected, thereby further improving accuracy of quality assessment.

A non-I-frame (such as a B-frame or a P-frame) uses correlation between video frames for compression, and therefore a stronger correlation, that is, lower time complexity, indicates a higher compression rate of the non-I-frame. Therefore, the time complexity of the scene may be obtained by calculating a ratio of a median or an average value of frame sizes of all non-I-frames in the scene in which the first video frame is located to a median or an average value of frame sizes of all I-frames in the scene. Specifically, the ratio may be directly used as the time complexity of the scene. Impact of correlation between video frames on the compression rate of the non-I-frame is considered, and therefore the time complexity may be accurately calculated, thereby further improving accuracy of quality assessment.

According to a second aspect, a method for implementing video quality assessment is provided, where the method includes:

determining that a first data packet in a plurality of data packets that are used to encapsulate a first video frame is lost;

obtaining a quality deterioration value of the first video frame by calculating a proportion of damaged data in the first video frame, where the damaged data includes image data affected by loss of the first data packet in the first video frame; and calculating, by using the following formula, a quality deterioration value of a GOP in which the first video frame is located;

$$xl = \beta * xle * \Delta t$$

where xle is the quality deterioration value of the first video frame, xl is the quality deterioration value of the GOP in which the first video frame is located, $\Delta t$ is a difference between a time point corresponding to the first video frame and a time point corresponding to a scene change frame that is located after the first video frame, that has a shortest distance to the first video frame, and that is in the GOP, $\beta$ is used to represent scene complexity of the scene in which the first video frame is located, a value of $\beta$ is greater than 0 and less than 1, a larger value of $\beta$ indicates higher complexity of the scene, and a smaller value of $\beta$ indicates lower complexity of the scene.

According to the method provided in the second aspect of the present invention, during video quality assessment, the proportion of the damaged data caused by packet loss in the video frame in which the damaged data is located is considered, and impact of the scene in which the video frame is located on a video frame located after the video frame is also considered. Therefore, accuracy of quality assessment is higher.

Specifically, $\beta$ may be calculated by using a formula $\beta = g(tcomp)$, where tcomp is time complexity of the scene in which the first video frame is located. A larger value of tcomp indicates a larger value of $\beta$ obtained through calculation by using the function $g(\ )$, and a smaller value of tcomp indicates a smaller value of $\beta$ obtained through calculation by using the function $g(\ )$.

The time complexity tcomp of the scene is used to represent a degree of correlation between adjacent video frames in the scene. Higher time complexity indicates a weaker correlation, and lower time complexity indicates a stronger correlation. The time complexity represents a degree of correlation between adjacent video frames in the scene. Therefore, the scene complexity may be effectively reflected, thereby further improving accuracy of quality assessment.

A non-I-frame (such as a B-frame or a P-frame) uses correlation between video frames for compression, and therefore a stronger correlation, that is, lower time complexity, indicates a higher compression rate of the non-I-frame. Therefore, the time complexity of the scene may be obtained by calculating a ratio of a median or an average value of frame sizes of all non-I-frames in the scene in which the first video frame is located to a median or an average value of frame sizes of all I-frames in the scene. Specifically, the ratio may be directly used as the time complexity of the scene. Impact of correlation between video frames on the compression rate of the non-I-frame is considered, and therefore the time complexity may be accurately calculated, thereby further improving accuracy of quality assessment.

According to a third aspect, a method for implementing video quality assessment is provided, where the method includes:

determining that a first data packet in a plurality of data packets that are used to encapsulate a first video frame is lost;

obtaining a quality deterioration value of the first video frame by calculating a proportion of damaged data in the first video frame, where the damaged data includes image data affected by loss of the first data packet in the first video frame;

determining a position of the damaged data in the first video frame; and correcting the quality deterioration value of the first video frame based on the position of the damaged data in the first video frame.

According to the method provided in the third aspect of the present invention, during video quality assessment, the proportion of the damaged data caused by packet loss in the video frame in which the damaged data is located is considered, and the position of the damaged data in the video frame is also considered. Therefore, accuracy of quality assessment is higher.

In a first possible implementation of the third aspect, specifically, the quality deterioration value of the first video frame may be corrected by using a formula $xle l2 = \alpha * xle l1$, where $xle l1$ is a quality deterioration value obtained before being corrected based on the position, $xle l2$ is a quality deterioration value obtained after being corrected based on the position, $\alpha$ is a correction factor and is used to represent a degree of impact of the position of the damaged data in the first video frame on quality of the first video frame, a value of $\alpha$ is greater than 0 and is less than or equal to 1, a smaller value of $\alpha$ indicates a lower impact degree, and a larger value of $\alpha$ indicates a higher impact degree.

In specific implementation, $\alpha$ may be calculated by using the following formula:

$$\alpha = f(damagePosition)$$

A variation amplitude of $\alpha$ that varies with damagePosition when damagePosition is greater than b (a value of b is greater than 0 and less than 0.5) is less than a variation amplitude of $\alpha$ that varies with damagePosition when damagePosition is smaller than b. A value of $\alpha$ calculated based on a larger damagePosition value is greater than or equal to a value of $\alpha$ calculated based on a smaller damagePosition value, and the value of $\alpha$ is greater than 0.

When damagePosition is less than b, that is, a damaged region is relatively close to the bottom of the first video frame, impact on video perception quality is relatively low. When damagePosition is greater than b, that is, when a damaged region covers a relatively large region close to the center position of the first video frame, impact on video perception quality is relatively low, or when a damaged region is relatively close to the bottom, impacts on the video perception quality that are caused by different sizes of damaged regions are obviously different. However, when the damaged region covers a relatively large region close to the center position, a difference between impacts on the video perception quality that are caused by different sizes of damaged regions is not significant. Therefore, the correction factor $\alpha$ obtained through calculation by using the formula may accurately reflect impact of the position of the damaged data on the video perception quality, and accuracy of quality assessment may be further improved.

According to a fourth aspect, an assessment apparatus is provided, where the assessment apparatus includes a determining unit and a calculation unit;

the determining unit is configured to determine that a first data packet in a plurality of data packets that are used to encapsulate a first video frame is lost; and the calculation unit is configured to: obtain a quality deterioration value of the first video frame by calculating a proportion of damaged data in the first video frame, where the damaged data includes image data affected by loss of the first data packet in the first video frame; determine whether the first video frame is a scene change frame; and when it is determined that the first video frame is not a scene change frame, correct the quality deterioration value of the first video frame based on a scene in which the first video frame is located.

According to the assessment apparatus provided in the fourth aspect of the present invention, during video quality assessment, the proportion of the damaged data caused by packet loss in the video frame in which the damaged data is located is considered, and impact of the scene in which the video frame is located on the video frame is also considered. Therefore, accuracy of quality assessment is higher.

In a first possible implementation of the fourth aspect, the calculation unit may be specifically configured to correct the quality deterioration value of the first video frame by using a formula xlec=β*xlel, where xlel is a quality deterioration value obtained before being corrected based on the scene, xlec is a quality deterioration value obtained after being corrected based on the scene, β is used to represent scene complexity of the scene in which the first video frame is located, a value of β is greater than 0 and less than 1, a larger value of β indicates higher complexity of the scene, and a smaller value of β indicates lower complexity of the scene.

According to this implementation, impact of the scene complexity of the scene in which the first video frame is located on the quality deterioration value is specifically considered, thereby further improving accuracy of quality assessment.

Specifically, β may be calculated by using a formula β=g(tcomp), where tcomp is time complexity of the scene in which the first video frame is located. A larger value of tcomp indicates a larger value of β obtained through calculation by using the function g( ), and a smaller value of tcomp indicates a smaller value of β obtained through calculation by using the function g ( ).

The time complexity tcomp of the scene is used to represent a degree of correlation between adjacent video frames in the scene. Higher time complexity indicates a weaker correlation, and lower time complexity indicates a stronger correlation. The time complexity represents a degree of correlation between adjacent video frames in the scene. Therefore, the scene complexity may be effectively reflected, thereby further improving accuracy of quality assessment.

A non-I-frame (such as a B-frame or a P-frame) uses correlation between video frames for compression, and therefore a stronger correlation, that is, lower time complexity, indicates a higher compression rate of the non-I-frame. Therefore, the time complexity of the scene may be obtained by calculating a ratio of a median or an average value of frame sizes of all non-I-frames in the scene in which the first video frame is located to a median or an average value of frame sizes of all I-frames in the scene. Specifically, the ratio may be directly used as the time complexity of the scene. Impact of correlation between video frames on the compression rate of the non-I-frame is considered, and therefore the time complexity may be accurately calculated, thereby further improving accuracy of quality assessment.

According to a fifth aspect, an assessment apparatus is provided, where the assessment apparatus includes a determining unit and a calculation unit;

the determining unit is configured to determine that a first data packet in a plurality of data packets that are used to encapsulate a first video frame is lost; and the calculation unit is configured to: obtain a quality deterioration value of the first video frame by calculating a proportion of damaged data in the first video frame, where the damaged data includes image data affected by loss of the first data packet in the first video frame; and calculate, by using the following formula, a quality deterioration value of a GOP in which the first video frame is located:

$$xl = \beta * xle * \Delta t$$

xle is the quality deterioration value of the first video frame, xl is the quality deterioration value of the GOP in which the first video frame is located, Δt is a difference between a time point corresponding to the first video frame and a time point corresponding to a scene change frame that is located after the first video frame, that has a shortest distance to the first video frame, and that is in the GOP, β is used to represent scene complexity of the scene in which the first video frame is located, a value of β is greater than 0 and less than 1, a larger value of β indicates higher complexity of the scene, and a smaller value of β indicates lower complexity of the scene.

According to the assessment apparatus provided in the fifth aspect of the present invention, during video quality assessment, the proportion of the damaged data caused by packet loss in the video frame in which the damaged data is located is considered, and impact of the scene in which the video frame is located on a video frame located after the video frame is also considered. Therefore, accuracy of quality assessment is higher.

Specifically, β may be calculated by using a formula β=g(tcomp), where tcomp is time complexity of the scene in which the first video frame is located. A larger value of tcomp indicates a larger value of β obtained through calculation by using the function g( ), and a smaller value of tcomp indicates a smaller value of β obtained through calculation by using the function g( ).

The time complexity tcomp of the scene is used to represent a degree of correlation between adjacent video frames in the scene. Higher time complexity indicates a weaker correlation, and lower time complexity indicates a stronger correlation. The time complexity represents a degree of correlation between adjacent video frames in the scene. Therefore, the scene complexity may be effectively reflected, thereby further improving accuracy of quality assessment.

A non-I-frame (such as a B-frame or a P-frame) uses correlation between video frames for compression, and therefore a stronger correlation, that is, lower time complexity, indicates a higher compression rate of the non-I-frame. Therefore, the time complexity of the scene may be obtained by calculating a ratio of a median or an average value of frame sizes of all non-I-frames in the scene in which the first video frame is located to a median or an average value of frame sizes of all I-frames in the scene. Specifically, the ratio may be directly used as the time complexity of the scene. Impact of correlation between video frames on the compression rate of the non-I-frame is considered, and therefore the time complexity may be accurately calculated, thereby further improving accuracy of quality assessment.

According to a sixth aspect, an assessment apparatus is provided, where the apparatus includes a determining unit and a calculation unit;

the determining unit is configured to determine that a first data packet in a plurality of data packets that are used to encapsulate a first video frame is lost; and the calculation unit is configured to obtain a quality deterioration value of the first video frame by calculating a proportion of damaged data in the first video frame, where the damaged data includes image data affected by loss of the first data packet in the first video frame; and is further configured to: determine a position of the damaged data in the first video frame, and correct the quality deterioration value of the first video frame based on the position of the damaged data in the first video frame.

According to the assessment apparatus provided in the sixth aspect of the present invention, during video quality assessment, the proportion of the damaged data caused by packet loss in the video frame in which the damaged data is located is considered, and the position of the damaged data in the video frame is also considered. Therefore, accuracy of quality assessment is higher.

In a first possible implementation of the sixth aspect, the calculation unit may be specifically configured to correct the quality deterioration value of the first video frame by using a formula xle12=α*xle11, where xle11 is a quality deterioration value obtained before being corrected based on the position, xle12 is a quality deterioration value obtained after being corrected based on the position, α is a correction factor and is used to represent a degree of impact of the position of the damaged data in the first video frame on quality of the first video frame, a value of α is greater than 0 and is less than or equal to 1, a smaller value of α indicates a lower impact degree, and a larger value of α indicates a higher impact degree.

In specific implementation, the calculation unit may calculate α by using the following formula:

$$\alpha = f(\text{damagePosition})$$

A variation amplitude of α that varies with damagePosition when damagePosition is greater than b (a value of b is greater than 0 and less than 0.5) is less than a variation amplitude of α that varies with damagePosition when damagePosition is smaller than b. A value of α calculated based on a larger damagePosition value is greater than or equal to a value of α calculated based on a smaller damagePosition value, and the value of α is greater than 0.

When damagePosition is less than b, that is, a damaged region is relatively close to the bottom of the first video frame, impact on video perception quality is relatively low. When damagePosition is greater than b, that is, when a damaged region covers a relatively large region close to the center position of the first video frame, impact on video perception quality is relatively low, or when a damaged region is relatively close to the bottom, impacts on the video perception quality that are caused by different sizes of damaged regions are obviously different. However, when the damaged region covers a relatively large region close to the center position, a difference between impacts on the video perception quality that are caused by different sizes of damaged regions is not significant. Therefore, the correction factor α obtained through calculation by using the formula may accurately reflect impact of the position of the damaged data on the video perception quality, and accuracy of quality assessment may be further improved.

According to a seventh aspect, an assessment apparatus is provided, where the assessment apparatus includes a processor and a memory;

the memory is configured to store a computer operation instruction; and the processor is configured to execute the computer operation instruction stored in the memory, so that the assessment apparatus performs the methods provided in the first aspect or any possible implementation of the first aspect, in the second aspect or any possible implementation of the second aspect, and in the third aspect or any possible implementation of the third aspect of the present invention.

According to the assessment apparatus provided in the seventh aspect of the present invention, during video quality assessment, the proportion of the damaged data caused by packet loss in the video frame in which the damaged data is located is considered, and other factors are also considered, such as the position of the damaged data in the video frame and impact of the scene in which the video frame is located on the video frame or a video frame located after the video frame. Therefore, accuracy of quality assessment is higher.

According to an eighth aspect, a transmission device is provided, where the transmission device includes a media unit and an assessment apparatus;

the media unit is configured to receive a media stream sent by a video server, send the media stream to another transmission device or video terminal, and transmit the media stream to the assessment apparatus; and the assessment apparatus may be specifically the assessment apparatus provided in any aspect or any possible implementation of any aspect of the fourth aspect to the seventh aspect of the present invention, and is configured to obtain the media stream from the media unit and perform an operation performed by the assessment apparatus provided in any aspect or any possible implementation of any aspect of the fourth aspect to the seventh aspect of the present invention, and in a process of performing the operation, specifically, determine, based on the media stream, that a first data packet in a plurality of data packets that are used to encapsulate a first video frame is lost.

According to the transmission device provided in the eighth aspect of the present invention, during video quality assessment, the proportion of the damaged data caused by packet loss in the video frame in which the damaged data is located is considered, and other factors are also considered, such as the position of the damaged data in the video frame and impact of the scene in which the video frame is located on the video frame or a video frame located after the video frame. Therefore, accuracy of quality assessment is higher.

According to a ninth aspect, a video terminal is provided, where the video terminal includes a media unit and an assessment apparatus;

the media unit is configured to receive a media stream sent by a video server, decode and play the media stream, and transmit the media stream to the assessment apparatus; and the assessment apparatus may be specifically the assessment apparatus provided in any aspect or any possible implementation of any aspect of the fourth aspect to the seventh aspect of the present invention, and is configured to obtain the media stream from the media unit and perform an operation performed by the assessment apparatus provided in any aspect or any possible implementation of any aspect of the fourth aspect to the seventh aspect of the present invention, and in a process of performing the operation, specifically, determine, based on the media stream, that a first data packet in a plurality of data packets that are used to encapsulate a first video frame is lost.

According to the video terminal provided in the ninth aspect of the present invention, during video quality assessment, the proportion of the damaged data caused by packet loss in the video frame in which the damaged data is located is considered, and other factors are also considered, such as the position of the damaged data in the video frame and impact of the scene in which the video frame is located on the video frame or a video frame located after the video frame. Therefore, accuracy of quality assessment is higher.

According to a tenth aspect, a system for implementing video quality assessment is provided, where the system includes a video server, a transmission device, and a video terminal, and a video stream sent by the video server is transmitted to the video terminal by using the transmission device; and the transmission device or the video terminal may specifically include the assessment apparatus provided in any aspect or any possible implementation of any aspect of the fourth aspect to the seventh aspect of the present invention; or the system further includes a first assessment apparatus, and specifically, the first assessment apparatus may be the assessment apparatus provided in any aspect or any possible implementation of any aspect of the fourth aspect to the seventh aspect of the present invention, the transmission device or the video terminal is connected to the first assessment apparatus, and the first assessment apparatus obtains the video stream by using the transmission device or the video terminal connected to the first assessment apparatus.

According to the system provided in the tenth aspect of the present invention, during video quality assessment, the proportion of the damaged data caused by packet loss in the video frame in which the damaged data is located is considered, and other factors are also considered, such as the position of the damaged data in the video frame and impact of the scene complexity of the scene in which the video frame is located on the video frame or a video frame located after the video frame. Therefore, accuracy of quality assessment is higher.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1A:
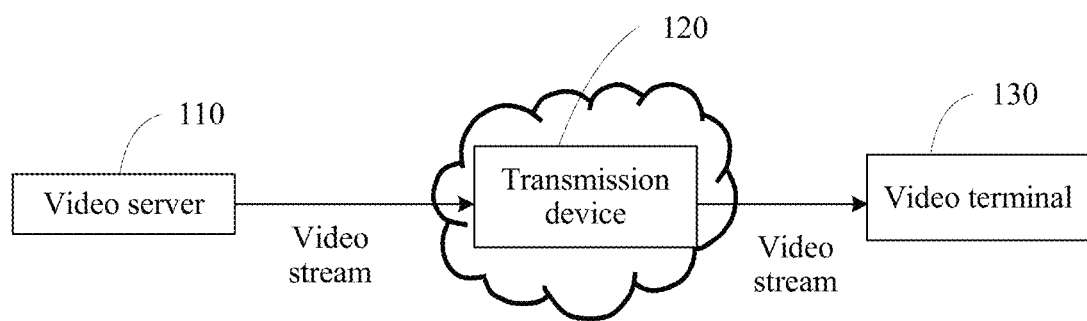
FIG. 1A, FIG. 1B, and FIG. 1C are schematic structural diagrams of networking of a video system 100 that is used to implement video quality assessment according to Embodiment 1 of the present invention.

FIG. 1A is a schematic structural diagram of networking of a video system 100 according to an embodiment of the present invention. The video system 100 includes a video server 110, one or more transmission devices 120, and a video terminal 130. A video stream sent by the video server 110 is transmitted to the video terminal 130 by using the transmission device 120.

Figure 1B:
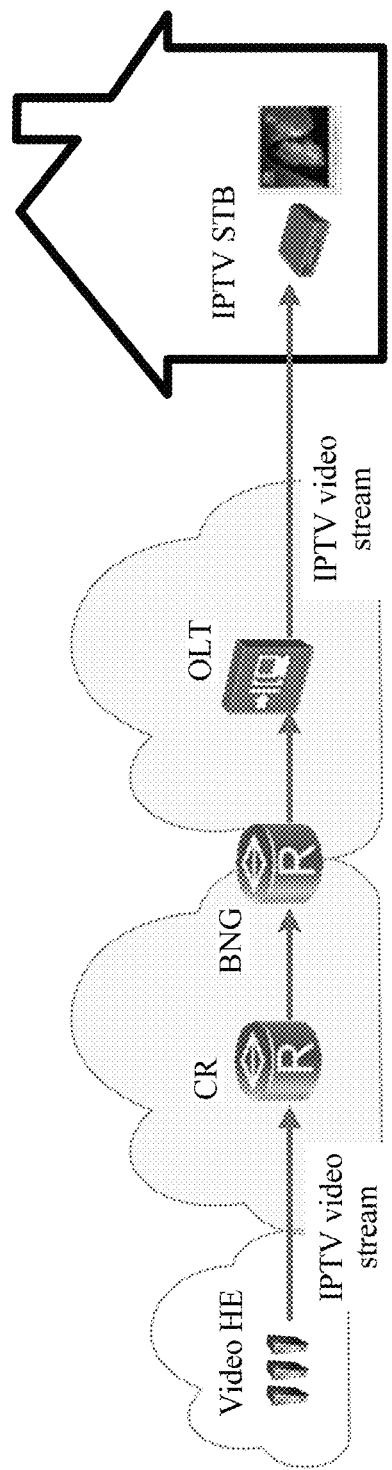

The video system 100 may be specifically an IPTV system shown in FIG. 1B. In the IPTV system, the video server 110 is specifically a video headend (video headEnd, video HE), the transmission device 120 specifically includes network devices such as a core router (Core Router, CR), a broadband network gateway (Broadband Network Gateway, BNG), and an optical line terminal (Optical Line Terminal, OLT); and the video terminal 130 is specifically a set top box (Set Top Box, STB).

In the video system shown in FIG. 1A and FIG. 1B, when the video stream is transmitted from the video server to the video terminal, status change of a network through which the video stream passes may cause abnormal phenomena of the video stream, such as packet loss, latency, jitter, and disorder. These abnormal phenomena may cause defects, such as artifacts and frame freezing, of a video image played on the screen of the video terminal, and consequently, video viewing experience of a user decreases. Therefore, video experience of a user needs to be monitored.

During video experience monitoring, an assessment apparatus that is configured to implement video quality assessment may be deployed in the video system to assess quality of the video stream. The assessment apparatus may be deployed in any device (such as the transmission device 120 or the video terminal 130) through which the video stream passes, or may be bypassed onto any device through which the video stream passes and obtains the video stream in a mirroring manner.

Figure 1C:
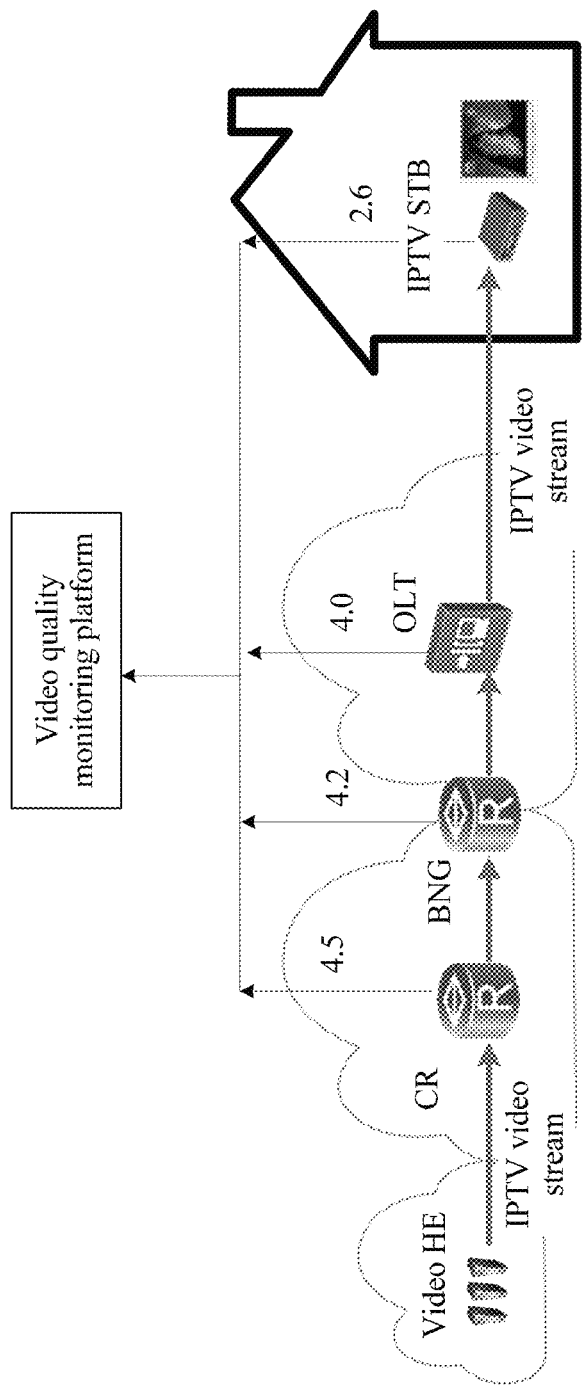

In specific implementation, assessment apparatuses may be separately deployed on network devices such as a CR, a BNG and an OLT, as shown in FIG. 1C. Network statuses of different network devices are different, and video streams that pass through these network devices may be affected in different ways. Network impairments of a same video stream on the CR, the BNG the OLT, and an STB are different, and therefore when video quality assessment is performed at different points, mean opinion scores of video (Mean Opinion Score of Video, MOSV) calculated based on an assessment result are different. As shown in FIG. 1C, in a specific example, MOSV values calculated on the CR, the BNG the OLT, and the STB are respectively 4.5, 4.2, 4.0, and 2.6 (a smaller value indicates lower quality). Assessment apparatuses deployed in the CR, the BNG the OLT, and the STB separately report assessed MOSV values to a video quality monitoring platform. An MOSV value calculated on the STB decreases sharply, and therefore the video monitoring platform may determine that a serious network failure occurs between the OLT and the STB. Therefore, the network failure may be delimited and located.

Figure 2:
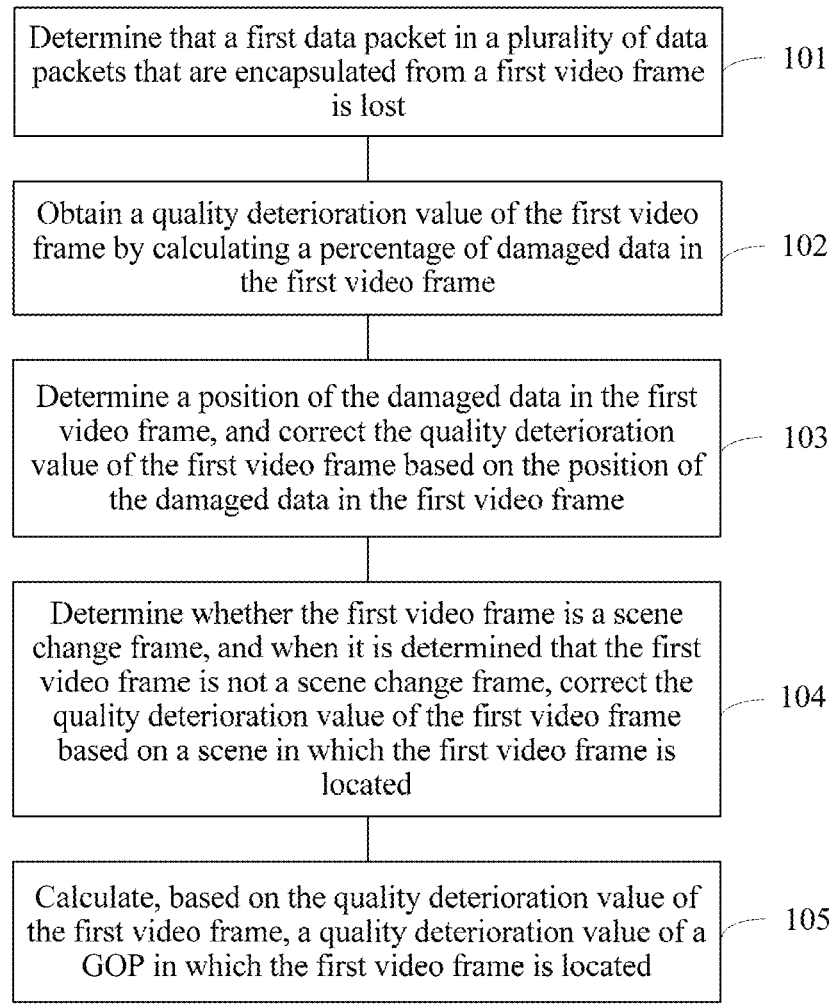
FIG. 2 is a schematic flowchart of a method according to Embodiment 1 of the present invention.

FIG. 2 is a schematic flowchart of a method according to Embodiment 1 of the present invention. The method of Embodiment 1 of the present invention is applied to the video system 100 shown in FIG. 1A and FIG. 1B, and is performed by an assessment apparatus.

As shown in FIG. 2, the method provided in Embodiment 1 of the present invention includes the following steps.

Step 101: Determine that a first data packet in a plurality of data packets that are used to encapsulate a first video frame is lost.

A specific implementation of step 101 may be obtaining a video stream and determining that the first data packet in the video stream is lost.

The assessment apparatus may be built in any device (such as a transmission device 120 or a video terminal 130) through which the video stream passes, or may be bypassed onto any device through which the video stream passes and obtains the video stream in a mirroring manner.

During coding, a video frame may be coded into a single strip or a plurality of strips. When the video frame is coded into a plurality of strips, coding and decoding of image data in a strip may not depend on image data in another strip. The following uses a scheme for coding each frame into a single strip as an example for description.

Figure 3A:
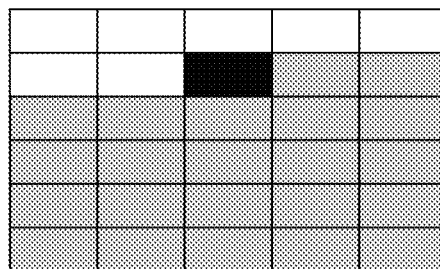
FIG. 3A and FIG. 3B are schematic diagrams of video frame packet loss according to Embodiment 1 of the present invention.

During transmission, a video frame may be encapsulated into a plurality of data packets. When a transport stream (Transport Stream, TS) protocol is used for transmission, the data packet is specifically a TS packet. When a user datagram protocol (User Datagram Protocol, UDP) is directly used for transmission, the data packet is specifically a UDP packet. As shown in FIG. 3A, the video frame is encapsulated into 30 data packets, and a data packet corresponding to a black region is the lost first data packet.

Step 102: Obtain a quality deterioration value of the first video frame (hereinafter referred to as a first quality deterioration value) by calculating a proportion of damaged data in the first video frame.

In specific implementation, the proportion may be directly used as the first quality deterioration value.

The first quality deterioration value may be used to represent a damage degree of the first video frame caused by loss of the first data packet. A larger first quality deterioration value indicates a higher damage degree of the first video frame, that is, lower quality of the first video frame. On the contrary, a smaller first quality deterioration value indicates a lower damage degree of the first video frame, that is, higher quality of the first video frame.

Figure 3B:
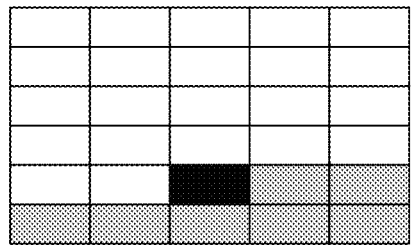

The damaged data includes image data affected by loss of the first data packet in the first video frame, and generally includes image data encapsulated in the first data packet and image data that is in the first video frame and that needs to be decoded based on the image data encapsulated in the first data packet. As shown in FIG. 3A and FIG. 3B, when the data packet corresponding to the black region is lost, even if data packets corresponding to gray regions in the video frame are all correctly received, decoding cannot be correctly performed because direct or indirect reference needs to be made to image data in the data packet corresponding to the black region during decoding of image data in the data packets corresponding to the gray regions. Therefore, the damaged data includes image data of the black region and the gray regions.

It should be noted that more than one data packet in a plurality of data packets that are used to encapsulate the first video frame may be lost. In the scheme for coding each frame into a single strip, if more than one data packet is lost, because each lost data packet may affect all subsequent data packets, only impact of a foremost data packet in the lost data packets needs to be considered, and the foremost data packet is used as the first data packet.

In addition, in this embodiment of the present invention, a sequence of data packets that are used to encapsulate a same video frame is a position sequence of image data encapsulated in all the data packets in the video frame. The data packets are usually sorted based on a left-right and top-bottom sequence. To be specific, a data packet used for encapsulating image data that is in an upper position of the video frame is located before a data packet encapsulated image data that is in a lower position. For image data in a same height, a data packet used for encapsulating image data that is in a left position is located before a data packet used for encapsulating image data that is in a right position. As shown in FIG. 3A, it is usually considered that any data packet in the second row is located before any data packet in the fifth row, and the second data packet in the second row is located before the third data packet in the second row.

Video quality assessment is performed before video decoding, and therefore decoded image data cannot be obtained to calculate a proportion of damaged data. Therefore, when the proportion of the damaged data is calculated, information about a data packet used for encapsulating image data is usually used for calculation. In addition, during calculation, the scheme for coding each frame into a single strip and a scheme for coding each frame into a plurality of strips need to be distinguished from each other. For a specific calculation manner, refer to ITU-T Recommendation P1201.2.

The following briefly describes a calculation manner for the scheme for coding each frame into a single strip.

$$xle = nap/np$$

nap is a quantity of data packets used for encapsulating the damaged data, and np is a quantity of all data packets that are used to encapsulate the first video frame. As shown in FIG. 3A, the first video frame is encapsulated into 30 data packets, and the first data packet is the $8^{th}$ data packet. Therefore, nap is 30−8+1=23, and the first quality deterioration value xle=23/30=0.7667. Further, as shown in FIG. 3B, the first video frame is encapsulated into 30 data packets, and the first data packet is the $23^{rd}$ data packet. Therefore, nap is 30−23+1=8, and the first quality deterioration value xle=8/30=0.2667.

Step 103: Determine a position of the damaged data in the first video frame, and correct the first quality deterioration value based on the position of the damaged data in the first video frame.

When facing an image on a screen, human eyes are usually most sensitive to damage in a center region of the image and are less sensitive to damage in another region. A reason is that a place (hereinafter referred to as a yellow spot) that is close to the center of a retina and that has a longest distance to a cornea is a position that has most dense photoreceptor cells and a highest acuteness of vision. When a person needs to see an object clearly, the person may move eyeballs until an image focuses on the yellow spot. A position that has a longer distance to the yellow spot indicates fewer photoreceptor cells and a more unclear image. In addition, human eyes are usually most interested in a center region of an image. As shown in FIG. 3A, the damaged data covers a center region and has relatively high impact on perception quality of human eyes. As shown in FIG. 3B, the damaged data does not cover the center region and has relatively low impact on perception quality of human eyes. Therefore, in this embodiment of the present invention, during video quality assessment, impact of a position of the damaged data in the first video frame is further considered.

In this embodiment of the present invention, when impact of a position of the damaged data is considered, only a case in which each frame is coded into a single strip is considered.

Step 103 may include step 103A and step 103B.

Step 103A: Determine a position damagePosition of the damaged data in the first video frame.

damagePosition is used to represent a relative position of a start position of the damaged data relative to an end position of the first video frame; a value of damagePosition is greater than 0 and is less than or equal to 1; and a smaller value of damagePosition indicates that the start position of the damaged data is closer to the bottom of the first video frame, and a larger value of damagePosition indicates that the start position of the damaged data is closer to the top of the first video frame.

As shown in FIG. 3A, when a scheme for coding each frame into a single strip is used, if packet loss occurs in a video frame (for example, the first video frame), a whole region (hereinafter referred to as a damaged region) from the first pixel of image data encapsulated in a lost data packet (for example, the first data packet) to the end position of the video frame is damaged. Therefore, as shown in FIG. 3A, if the image data encapsulated in the lost data packet is on an upper part of the video frame, image data in the center position of the video frame is definitely damaged.

In this embodiment of the present invention, the relative position of the start position of the damaged data relatively to the end position of the first video frame is used to represent a position of the damaged data in the video frame. Specifically, damagePosition may be calculated by using the following formula:

$$damagePosition = \frac{np - lossPosition + 1}{np}$$

np is a quantity of all data packets that are used to encapsulate the first video frame, and lossPosition is a position of the first data packet in all the data packets (to be specific, a sequence of the first data packet in all the data packets). It may be learned that a calculated value range of damagePosition is [0,1], and that the damaged region is closer to the bottom of the video frame indicates that the value of damagePosition is closer to 0, and a damage degree is lower.

As shown in FIG. 3A and FIG. 3B, a total quantity of data packets of each of two video frames is 30, that is, each video frame is encapsulated into 30 data packets. In FIG. 3A, the first lost data packet is the $8^{th}$ data packet, and therefore damagePosition is (30−8)/30=0.7333. In FIG. 3B, the first lost data packet is the $23^{rd}$ packet, and therefore damagePosition is (30−23)/30=0.2333.

Step 103B: Correct the first quality deterioration value based on the position.

Specifically, correction may be performed by using the following formula:

$$xle2 = \alpha * xle1$$

xle1 is a first quality deterioration value obtained before being corrected based on the position, xle2 is a first quality deterioration value obtained after being corrected based on the position, α is a correction factor and is used to represent a degree of impact of the position of the damaged data on quality of the first video frame, a value of α is greater than 0 and is less than or equal to 1, a larger value of α indicates a higher impact degree, and a smaller value of α indicates a lower impact degree. A value of α depends on a position of the damaged data in the image, and may be calculated by using the following formula:

$$\alpha = f(damagePosition)$$

A variation amplitude of α that varies with damagePosition when damagePosition is greater than b (a value of b is greater than 0 and less than 0.5) is less than a variation amplitude of α that varies with damagePosition when damagePosition is smaller than b. A value of α calculated based on a larger damagePosition value is greater than or equal to a value of α calculated based on a smaller damagePosition value, and the value of α is greater than 0.

As an example, the value of α may be calculated by using the following formula:

$$\alpha = \begin{cases} a \cdot damagePosition, & damagePosition \leq b \\ 1, & damagePosition > b \end{cases}$$

or $$\alpha = \begin{cases} a \cdot damagePosition, & damagePosition < b \\ 1, & damagePosition \geq b \end{cases}$$

A value of a is greater than 0 and is less than or equal to 1, and a value of b is greater than 0 and is less than or equal to 0.5.

That the damaged region is closer to the bottom of a damaged frame indicates lower impact on video perception quality. For example, b is equal to 0.05 (which is corresponding to a position close to the bottom of the video frame), and therefore a position less than b is a position excessively close to the bottom of the image, and impact on video perception quality is excessively low. For example, when a is equal to 0.01, and b is equal to 0.3, it indicates that the impact on video perception quality is excessively low when the damaged data is close to the bottom of the video frame. In this case, α may be calculated by using the coefficient a, so as to reduce the first quality deterioration value.

Based on the foregoing formula, when damagePosition is greater than (or greater than or equal to) b, that is, when the damaged region covers a relatively large region close to the center position of the first video frame, α is equal to 1. When the first quality deterioration value obtained after being corrected is equal to the first quality deterioration value obtained before being corrected, which indicates that the damaged region covers a relatively large region close to the center position of the first video frame, a proportion of the damaged data in the first video frame can reflect the degree of impact of the damaged data on the first video frame.

Based on the foregoing formula, when damagePosition is less than (or is less than or equal to) b, that is, the damaged region is relatively close to the bottom of the first video frame, α is equal to a*damagePosition. Because the value of a is greater than 0 and is less than or equal to 1, and damagePosition is greater than 0 and less than 1, α is greater than 0 and less than 1, and the first quality deterioration value obtained after being corrected is less than the first quality deterioration value obtained before being corrected. Actually, when the damaged data is relatively close to the bottom of the video frame, the degree of impact of the damaged data on quality of the first video frame is lower than the impact degree reflected by the first quality deterioration value that is calculated based on only the proportion of the damaged data. Therefore, in this case, the first quality deterioration value obtained after being corrected by using the foregoing formula can better reflect an actual impact degree.

In specific implementation, optimal values of a and b may be obtained through training by using a heuristic algorithm, so that a final assessed video quality value is closest to a video subjective test value. For example, a plurality of video frames with different damaged regions are selected for correcting based on different values of a and different values b, so as to obtain first quality deterioration values for subjective scoring. When the value of a is A (for example, 0.01), and the value of b is B (for example, 0.3), if a first quality deterioration value of each video frame that is obtained after being corrected is closest to a subjective score, A and B are respectively set to values of a and b.

It is assumed that a and b are respectively set to 0.01 and 0.3. As shown in FIG. 3A, the damaged data covers the center region, damagePosition is equal to 0.7333, which is greater than 0.3, and therefore $\alpha$ is equal to 1. Correspondingly, the first quality deterioration value obtained after being corrected is the same as the first quality deterioration value obtained before being corrected. Further, as shown in FIG. 3B, the damaged data covers only a region close to the bottom, damagePosition is equal to 0.2333, which is less than 0.3, and therefore $\alpha$ is equal to 0.2333*0.3=0.0700. Correspondingly, it is assumed that the first quality deterioration value obtained before being corrected is 0.2667, and therefore the first quality deterioration value obtained after being corrected is 0.2667*0.0700=0.0187, which is less than the first quality deterioration value obtained before being corrected.

As an example, alternatively, the value of $\alpha$ may be calculated by using the following formula:

$$\alpha = \begin{cases} a1 \cdot damagePosition, & damagePosition \leq b \\ a2 \cdot damagePosition, & damagePosition > b \end{cases}$$

or $$\alpha = \begin{cases} a1 \cdot damagePosition, & damagePosition < b \\ a2 \cdot damagePosition, & damagePosition \geq b \end{cases}$$

Values of a1 and a2 are greater than 0 and are less than or equal to 1, and a value of b is greater than 0 and is less than or equal to 0.5.

In specific implementation, optimal values of a1, a2, and b may be obtained through training by using the foregoing heuristic algorithm.

Step 104: When it is determined that the first video frame is not a scene change frame, correct the first quality deterioration value based on a scene in which the first video frame is located.

When packet loss occurs, a video terminal (for example, a set top box) may usually use error concealment to mitigate impact. An error concealment method is usually using a time correlation between video frames, and when damaged data in the damaged frame (for example, the first video frame in this embodiment of the present invention) is restored, using video content that is in a frame preceding the damaged frame and that is corresponding to the damaged region as video content of the damaged region to restore the damaged frame. Therefore, a smaller difference between content of the damaged frame and content of the frame preceding the damaged frame indicates a better compensation effect.

If the damaged frame is a scene change frame, for example, the video frame preceding the damaged frame is an image of a photographed football field, and the damaged frame is an image of a photographed auditorium, in this case, there is almost no error concealment effect. In this case, there is no need to correct the first quality deterioration value.

If the damaged frame is not a scene change frame, for example, the damaged frame and the video frame preceding the damaged frame are images of the photographed football field or images of the photographed auditorium, error concealment may be performed. The error concealment effect depends on a condition of a scene in which the damaged frame is located, for example, scene complexity of the scene in which the damaged frame is located.

The scene complexity of the scene may depend on time complexity and/or space complexity of the scene.

The space complexity of the scene is used to represent a diversification degree of image details of a video frame in the scene. Higher space complexity indicates more details and correspondingly a better error concealment effect. Lower space complexity indicates fewer details and correspondingly a worse error concealment effect.

The time complexity of the scene is used to represent a degree of correlation between adjacent video frames in the scene. Higher time complexity indicates a weaker correlation, and lower time complexity indicates a stronger correlation.

Generally, lower time complexity of the scene, that is, a slower video movement, for example, in the scene including images of the auditorium, indicates a stronger correlation between adjacent frames and a better error concealment effect; and higher time complexity of the scene, that is, a faster video movement, for example, in the scene including images of the football field, indicates a weaker correlation between adjacent frames and a worse error concealment effect.

Therefore, in step 104, specifically, the first quality deterioration value may be corrected based on scene complexity of the scene in which the first video frame is located.

When the damaged frame is not a scene change frame, a correction factor $\beta$ may be introduced to correct the first quality deterioration value.

xlec=$\beta$*xlel, where xlel is a first quality deterioration value obtained before being corrected based on the scene, xlec is a first quality deterioration value obtained after being corrected based on the scene, $\beta$ is used to represent the scene complexity of the scene in which the first video frame is located, a value of $\beta$ is greater than 0 and less than 1, a larger value of $\beta$ indicates higher complexity of the scene, and a smaller value of $\beta$ indicates lower complexity of the scene.

According to this implementation, impact of the scene complexity of the scene in which the first video frame is located on the quality deterioration value is specifically considered, thereby further improving accuracy of quality assessment.

Specifically, $\beta$ may be calculated in the following manner.

$\beta$=(tcomp), where tcomp is time complexity of the scene in which the damaged frame is located. A larger value of tcomp indicates a larger value of $\beta$ obtained through calculation by using the function g( ), and a smaller value of tcomp indicates a smaller value of $\beta$ obtained through calculation by using the function g( ). In specific implementation, β may be equal to the time complexity of the scene, that is, β=tcomp. The time complexity represents a degree of correlation between adjacent video frames in the scene. Therefore, the scene complexity may be effectively reflected, thereby further improving accuracy of quality assessment.

The time complexity of the scene may be used to represent a degree of correlation between adjacent video frames in the scene, and a non-I-frame (such as a B-frame or a P-frame) uses correlation between video frames for compression. Therefore, a stronger correlation, that is, lower time complexity, indicates a higher compression rate of the non-I-frame, and the time complexity of the scene may be obtained by calculating a ratio of a median or an average value of frame sizes of all non-I-frames in the scene in which the first video frame is located to a median or an average value of frame sizes of all I-frames in the scene. Specifically, the ratio may be directly used as the time complexity of the scene. For example, the first quality deterioration value obtained before being corrected is 0.77. When the scene complexity is relatively high, and a value of β is 0.8, a corrected deterioration value is 0.62. When the scene complexity is relatively low, and the value of β is 0.1, the first quality deterioration value obtained after being corrected is 0.077.

Impact of correlation between video frames on the compression rate of the non-I-frame is considered, and therefore the time complexity may be accurately calculated, thereby further improving accuracy of quality assessment.

Before the time complexity of the scene in which the damaged frame is located is calculated, specifically, the scene (hereinafter referred to as a target scene) in which the first video frame is located may be determined in the following manner, and further, the foregoing manner may be used to determine the time complexity of the scene.

A scene change frame (hereinafter referred to as a start scene change frame) that is located before the first video frame and that has a shortest distance to the first video frame is determined, and a scene change frame (hereinafter referred to as an end scene change frame) that is located after the first video frame and that has a shortest distance to the first video frame is determined. A scene that is corresponding to the start scene change frame and video frames between the start scene change frame and the end scene change frame is determined as the target scene, that is, the start scene change frame is the first video frame of the target scene, and a frame preceding the end scene change frame is the last video frame of the target scene.

In Embodiment 1 of the present invention, specifically, a scene change frame of a video in which the first video frame is located may be identified in the following manner. Further, based on an identification result in step 104, whether the first video frame is a scene change frame may be determined, the scene change frame (that is, the start scene change frame) that is located before the first video frame and that has a shortest distance to the first video frame may be determined, the scene change frame (that is, the end scene change frame) that is located after the first video frame and that has a shortest distance to the first video frame may be determined, and the like.

Figure 4A:
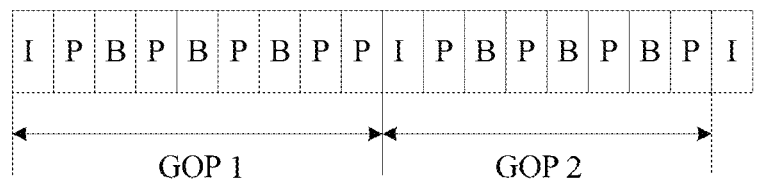
FIG. 4A is a schematic diagram of a GOP according to Embodiment 1 of the present invention.

A decoded video frame sequence includes a plurality of groups of pictures (Group of Picture, GOP). As shown in FIG. 4A, each GOP usually starts from an I-frame, is followed by some P-frames and B-frames, and ends at a frame preceding a next I-frame.

Specifically, the scene change frame of the video in which the first video frame is located may be identified in one of the following two manners.

Manner 1: Identifying scene change frames only in the I-frames.

An I-frame of the first GOP is determined as the scene change frame, and it is successively determined, in the following manners, whether each subsequent I-frame (an I-frame that is being determined is hereinafter referred to as an I-frame of the $K^{th}$ GOP) is the scene change frame.

1. Calculate a ratio $r_I$ of a size of the I-frame of the $K^{th}$ GOP to a size of an I-frame of the $(K-1)^{th}$ GOP.

2. Calculate a ratio $r_P$ of an average value of sizes of all P-frames in the $(K-1)^{th}$ GOP to an average value of sizes of all P-frames in the $K^{th}$ GOP.

3. Calculate a ratio $r_B$ of an average value of sizes of all B-frames in the $(K-1)^{th}$ GOP to an average value of sizes of all B-frames in the $K^{th}$ GOP.

4. If the ratio $r_I$ is greater than a first threshold or less than a second threshold, the following condition (1) and condition (2) are further determined; or if the ratio $r_I$ is not greater than the first threshold and is not less than the second threshold, it is determined that the I-frame of the $K^{th}$ GOP is not a scene change frame.

Condition (1): $r_P$ is less than a third threshold or $r_P$ is greater than a fourth threshold.

Condition (2): $r_B$ is less than a fifth threshold or $r_B$ is greater than a sixth threshold.

If both condition (1) and condition (2) are met, it is determined that the I-frame of the $K^{th}$ GOP is the scene change frame; or if any one of condition (1) and condition (2) is not met, it is determined that the I-frame of the $K^{th}$ GOP is not a scene change frame.

For a specific determining method in Manner 1, refer to ITU-T Recommendation P1201.2.

Manner 2: Identifying scene change frames in the I-frame and the P-frame.

1. Identify a type (such as an I-frame, a P-frame, or a B-frame) of each video frame in the video, so as to determine each GOP included in the video.

2. Identify scene change frames of all I-frames in the video in Manner 1.

Subsequent steps are separately performed on all GOPs starting from the first GOP, and scene change frames in all the GOPs (a GOP that is being determined is hereinafter referred to as the $K^{th}$ GOP) are successively identified.

3. Determine a maximum P-frame Pmax in all P-frames of the $K^{th}$ GOP, where a size of Pmax is $P_k^{max}$.

4. Calculate a relative size $R_k^I$:

$$R_k^I = \frac{P_k^{max}}{S_{SC}^I}$$

of $P_k^{max}$ and $S_{SC}^I$, where $S_{SC}^I$ is a median or an average value of sizes of a plurality of I-frames between Pmax and a scene change frame that is located before Pmax and that has a shortest distance to the Pmax.

5. If $R_k^I$ greater than the first threshold, calculate a relative size $R_k^P$:

$$R_k^P = \frac{P_k^{max}}{S_{SC}^P}$$

of $P_k^I$ and $S_{SC}^P$, where $S_{SC}^P$ a median or an average value of sizes of a plurality of P-frames in the $K^{th}$ GOP. The first threshold is greater than 0 and less than 1, and may be specifically 0.53.

Specifically, $S_{SC}^P$ may be calculated by using the following formula:

$S_{SC}^P = F$ (P−m, . . . , P−1, P1, . . . , Pn), where P−m, . . . , P−1 represent P-frames that are in the $K^{th}$ GOP and that are located before Pmax, P1, . . . , Pn represent P-frames that are in the $K^{th}$ GOP and that are located after Pmax, and F is used to calculate a median or an average value of sizes of P−m, . . . , P−1, P1, . . . , Pn.

m=min(num_before_P_frames, max_num)
n=min(num_after_P_frames, max_num)

num_before_P_frames is a quantity of P-frames that are in the $K^{th}$ GOP and that are located before Pmax, num_after_P_frames is a quantity of P-frames that are in the $K^{th}$ GOP and that are located behind Pmax, and max_num represents a preset quantity of frames that need to be considered, which may be set to 6.

6. If $R_k^P$ is greater than the second threshold, determine that Pmax is the scene change frame; or if $R_k^P$ is not greater than the second threshold, determine that Pmax is not the scene change frame. If a current GOP is the last GOP of the video, an identification process ends; or if the current GOP is not the last GOP of the video, steps 3-6 are performed again for a next GOP.

It should be noted that step 2 may be performed first and then steps 3-6 are performed, that is, scene change frames in all I-frames are identified first, and then scene change frames in all P-frames are identified. Alternatively, step 2 may be inserted into steps 3-6, and scene change frames are successively identified based on a sequence of frames, that is, all GOPs are identified one by one based on the sequence of the GOPs, so as to identify scene change frames in the current GOP. In addition, when the scene change frames in the current GOP are identified, it is determined first whether the I-frame in the current GOP is the scene change frame, and then it is determined whether Pmax in the current GOP is the scene change frame.

The quality deterioration value of the damaged frame is calculated in steps 101-104. Actually, packet loss may cause impact on quality of a video frame (that is, a damaged frame) in which a lost data packet is located, and may cause impact on quality of a subsequent video frame.

Figure 4B:
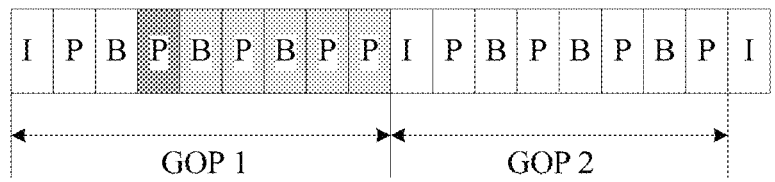
FIG. 4B and FIG. 4C are schematic diagrams of error spreading according to Embodiment 1 of the present invention.
Figure 4C:
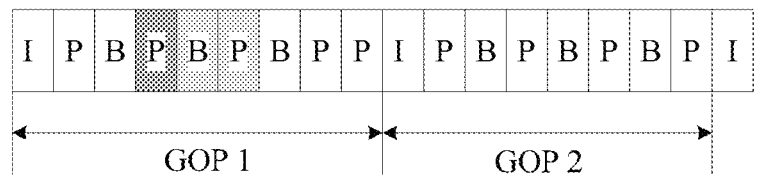

A decoded video frame sequence includes a plurality of GOPs. As shown in FIG. 4A, each GOP usually starts from an I-frame, is followed by some P-frames and B-frames, and ends at a frame preceding a next I-frame. The I-frame is an intra frame, the P-frame is a forward reference frame, and the B-frame is a bi-directional reference frame. When packet loss occurs in a frame of a GOP, a decoding error caused by the packet loss may continue to spread in subsequent video frames, and it is usually considered that the decoding error spreads to the last frame of the GOP. As shown in FIG. 4B, when the fourth frame in a GOP 1 is damaged, an error may spread to the last frame of the GOP. However, when a scene change frame is included in the GOP, content of the scene change frame is totally different from content of a frame preceding the scene change frame, and during coding, macroblocks in the scene change frame usually use intra frame predictive coding. Therefore, if a frame that is in the GOP and that is located before the scene change frame is damaged, error spreading may end at the scene change frame. As shown in FIG. 4C, the sixth frame in the GOP 1 is the scene change frame, and when the fourth frame is damaged, error spreading ends at the sixth frame.

Based on the foregoing analysis, the following estimates impact of packet loss on quality of subsequent video frames in step 105.

It should be noted that a sequence of the frames in this embodiment of the present invention is a time sequence of the frames in a video. For example, a video with duration of T (for example, 10 seconds) includes a video frame 1 at a time point t1 and a video frame 2 at a time point t2. If t1 is less than t2, for example, t1 is 1 second and 30 milliseconds, and t2 is 5 seconds and 40 milliseconds, it is considered that the video frame 1 is located before the video frame 2.

Step 105: Calculate, based on the quality deterioration value of the first video frame, a quality deterioration value (hereinafter referred to as a second quality deterioration value) of a GOP in which the first video frame is located.

The second quality deterioration value may be used to represent a degree of damage that is of the GOP in which the first video frame is located and that is caused by loss of the first data packet. A larger second quality deterioration value indicates a higher damage degree of the GOP, that is, lower quality of the GOP. On the contrary, a smaller second quality deterioration value indicates a lower damage degree of the GOP, that is, higher quality of the GOP.

Step 105 may be implemented in an implementation A or an implementation B.

Implementation A:

When the GOP in which the first video frame is located includes the scene change frame that is located after the first video frame, the second quality deterioration value may be calculated by using the following formula:

$$x1 = \beta * x1e * \Delta T_{SC}$$

xle is the first quality deterioration value, x1 is the second quality deterioration value, the second quality deterioration value is used to represent a degree of damage that is of the GOP in which the first video frame is located and that is caused by loss of the first data packet, Δt is a difference between a time point corresponding to the first video frame and a time point corresponding to a scene change frame that is located after the first video frame, that has a shortest distance to the first video frame, and that is in the GOP, β is used to represent scene complexity of the scene in which the first video frame is located, a value of β is greater than 0 and less than 1, a larger value of β indicates higher complexity of the scene, and a smaller value of β indicates lower complexity of the scene. For a calculation manner of β, refer to the calculation manner of β in step 104. Details are not described again.

As shown in FIG. 4C, the fourth frame of the GOP 1 is a damaged frame, the sixth frame of the GOP 1 is the scene change frame that is located after the first video frame and that has a shortest distance to the first video frame, a frame rate of the video is 15 frames/second, that is, a time difference between two adjacent frames is 1000 milliseconds/15=67 ms, and therefore $\Delta T_{SC}$ is 134 ms.

Specifically, the foregoing manner 2 may be used to determine the scene change frame that is located after the first video frame and that has a shortest distance to the first video frame.

In addition, when the GOP in which the first video frame is located does not include the scene change frame that is located after the first video frame, the second quality deterioration value may be calculated by using the following formula:

$$x1 = \beta * x1e * \Delta T_I$$

xle is the first quality deterioration value, xl is the second quality deterioration value, and $\Delta T_{SC}$ is a difference between a time point corresponding to the first video frame and a time point corresponding to the first I-frame that is located after the first video frame. The first I-frame that is located after the first video frame is a first frame of a GOP that is located after the GOP in which the first video frame is located. β is used to represent scene complexity of the scene in which the first video frame is located, a value of β is greater than 0 and less than 1, a larger value of β indicates higher complexity of the scene, and a smaller value of β indicates lower complexity of the scene. For a calculation manner of β, refer to the calculation manner of β in step 104. Details are not described again.

As shown in FIG. 4B, the fourth frame of the GOP 1 is a damaged frame, the first frame of the GOP 2 is the first I-frame that is located after the first video frame, a frame rate of the video is 15 frames/second, that is, a time difference between two adjacent frames is 1000 milliseconds/15=67 ms, and therefore $\Delta T_I$ is 335 ms.

Specifically, the foregoing manner 2 may be used to determine the scene change frame that is located after the first video frame and that has a shortest distance to the first video frame.

Obviously, when the GOP in which the first video frame is located does not include the scene change frame that is located after the first video frame, the scene change frame that is located after the first video frame and that has a shortest distance to the first video frame is located after the first I-frame that is located after the first video frame.

Therefore, two foregoing formulas that are used to calculate the second quality deterioration value may be combined to obtain the following formula:

$$xl=\beta*xle*\min(\Delta T_{SC},\Delta T_I)$$

Implementation B:

No matter whether the GOP in which the first video frame is located includes the scene change frame that is located after the first video frame, the second quality deterioration value is calculated by using the following formula:

$$xl=\beta*xle*\Delta T_I$$

xle is the first quality deterioration value, xl is the second quality deterioration value, and $\Delta T_{SC}$ is a difference between a time point corresponding to the first video frame and a time point corresponding to the first I-frame that is located after the first video frame. β is used to represent scene complexity of the scene in which the first video frame is located, a value of β is greater than 0 and less than 1, a larger value of β indicates higher complexity of the scene, and a smaller value of β indicates lower complexity of the scene. For a calculation manner of β, refer to the calculation manner of β in step 104. Details are not described again. When the scene in which the first video frame is located is determined, specifically, a start scene change frame and an end scene change frame of the scene may be determined in the foregoing manner 1 or 2.

In specific implementation, after steps 101 and 102 are performed, any step or any combination of a plurality of steps in steps 103-105 may be performed.

When both step 103 and step 104 are performed, there is no specified sequence between step 103 and step 104. If step 103 is performed first and then step 104 is performed, the first quality deterioration value that is corrected in step 103 is further corrected in step 104; or if step 104 is performed first and then step 103 is performed, the first quality deterioration value that is corrected in step 104 is further corrected in step 103.

The following shows examples of several specific implementations:

Implementation 1: Steps 101, 102, and 103 are included, and the first quality deterioration value that is corrected in step 103 is the first quality deterioration value that is calculated in step 102. Step 105 may be further included. Correspondingly, the first quality deterioration value that is used when the second quality deterioration value is calculated in step 105 is the first quality deterioration value that is corrected in step 103.

Implementation 2: Steps 101, 102, and 104 are included, and the first quality deterioration value that is corrected in step 104 is the first quality deterioration value that is calculated in step 102. Step 105 may be further included. Correspondingly, the first quality deterioration value that is used when the second quality deterioration value is calculated in step 105 is the first quality deterioration value that is corrected in step 104.

Implementation 3: Steps 101, 102, and 105 are included. Correspondingly, the first quality deterioration value that is used when the second quality deterioration value is calculated in step 105 is the first quality deterioration value that is calculated in step 102.

According to the method provided in Embodiment 1 of the present invention, during video quality assessment, the proportion of the damaged data caused by packet loss in the video frame in which the damaged data is located is considered, and other factors are also considered, such as the position of the damaged data in the video frame and impact of the scene complexity of the scene in which the video frame is located on the video frame or a video frame located after the video frame. Therefore, accuracy of quality assessment is higher.

In addition, when packet loss occurs in a plurality of video frames in the GOP in which the first video frame is located, after step 105 is performed, summation may be further performed on second quality deterioration values corresponding to the plurality of video frames to calculate a total quality deterioration value of the GOP. For a specific calculation manner, refer to ITU-T Recommendation P1201.2.

A measurement window may include a plurality of GOPs. Further, a packet loss magnitude lossMagnitude of the measurement window may be calculated by using the formula below. For a specific calculation manner, refer to ITU-T Recommendation $$LossMagnitude = \frac{\sum_k xl_k}{\sum_k T_k}$$

k is a sequence number of each GOP in the measurement window, xlk is a total quality deterioration value of the $k^{th}$ GOP, and Tk is a quantity of frames included in the $k^{th}$ GOP.

Further, based on the parameter LossMagnitude and video coding information, a quality distortion QtraV caused by data packet loss may be further estimated by using a quality estimation model, and finally a program source compression distortion QcodV and a network transmission distortion QtraV are also considered to calculate a final mean opinion score of video (Mean Opinion Score of Video, MOSV). For a specific calculation manner, refer to ITU-T Recommendation P1201.2.

Figure 5:
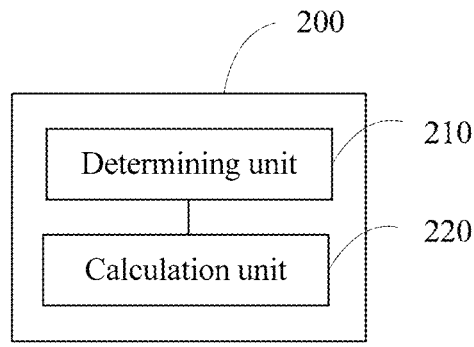
FIG. 5 is a schematic structural diagram of an assessment apparatus 200 according to Embodiment 2 of the present invention.

Based on Embodiment 1 of the present invention, Embodiment 2 of the present invention provides an assessment apparatus 200. As shown in FIG. 5, the assessment apparatus 200 includes a determining unit 210 and a calculation unit 220.

The determining unit 210 is configured to determine that a first data packet in a plurality of data packets that are used to encapsulate a first video frame is lost.

For ease of description, in this embodiment of the present invention, a quality deterioration value of the first video frame is briefly referred to as a first quality deterioration value, and a quality deterioration value of a GOP in which the first video frame is located is briefly referred to as a second quality deterioration value.

In a First Implementation:

The calculation unit 220 is configured to: obtain a quality deterioration value of the first video frame (that is, the first quality deterioration value) by calculating a proportion of damaged data in the first video frame, where the damaged data includes image data affected by loss of the first data packet in the first video frame; determine whether the first video frame is a scene change frame; and when it is determined that the first video frame is not a scene change frame, correct the first quality deterioration value based on a scene in which the first video frame is located.

Specifically, the first quality deterioration value may be corrected by using a formula xlec=β*xle1, where xle1 is a first quality deterioration value obtained before being corrected based on the scene, xlec is a first quality deterioration value obtained after being corrected based on the scene, β is used to represent scene complexity of the scene in which the first video frame is located, a value of β is greater than 0 and less than 1, a larger value of β indicates higher complexity of the scene, and a smaller value of β indicates lower complexity of the scene.

Further, the calculation unit 220 may be configured to: after obtaining the first quality deterioration value, and before correcting the first quality deterioration value based on the scene in which the first video frame is located, determine a position of the damaged data in the first video frame; and correct the first quality deterioration value based on the position of the damaged data in the first video frame. Correspondingly, the calculation unit 220 corrects, based on the scene complexity of the scene in which the first video frame is located, the first quality deterioration value that is obtained after being corrected based on the position.

Specifically, the calculation unit 220 may correct the first quality deterioration value by using a formula xle12=α*xle11, where xle11 is a first quality deterioration value obtained before being corrected based on the position, xle12 is a first quality deterioration value obtained after being corrected based on the position, α is a correction factor and is used to represent a degree of impact of the position of the damaged data on quality of the first video frame, a value of α is greater than 0 and is less than or equal to 1, a smaller value of α indicates a lower impact degree, and a larger value of α indicates a higher impact degree.

The calculation unit 220 may calculate α by using the following formula:

$$\alpha = f(\text{damagePosition})$$

For a specific calculation manner of α, refer to step 103 of Embodiment 1 of the present invention. Details are not described again.

In addition, the calculation unit 220 may be further configured to: after correcting the first quality deterioration value based on the scene complexity of the scene in which the first video frame is located, calculate, by using the following formula, the quality deterioration value (that is, the second quality deterioration value) of the GOP in which the first video frame is located.

$$xl = \beta^* xle^* \Delta t$$

xle is the first quality deterioration value, xl is the second quality deterioration value, Δt is a difference between a time point corresponding to the first video frame and a time point corresponding to a scene change frame that is located after the first video frame, that has a shortest distance to the first video frame, and that is in the GOP, β is used to represent scene complexity of the scene in which the first video frame is located, a value of β is greater than 0 and less than 1, a larger value of β indicates higher complexity of the scene, and a smaller value of β indicates lower complexity of the scene.

In a Second Implementation:

The calculation unit 220 is configured to: obtain the first quality deterioration value by calculating a proportion of damaged data in the first video frame, where the damaged data includes image data affected by loss of the first data packet in the first video frame; and calculate the second quality deterioration value by using the following formula:

$$xl = \beta^* xle^* \Delta t$$

xle is the first quality deterioration value, xl is the second quality deterioration value, Δt is a difference between a time point corresponding to the first video frame and a time point corresponding to a scene change frame that is located after the first video frame, that has a shortest distance to the first video frame, and that is in the GOP, β is used to represent scene complexity of the scene in which the first video frame is located, a value of β is greater than 0 and less than 1, a larger value of β indicates higher complexity of the scene, and a smaller value of β indicates lower complexity of the scene.

Further, the calculation unit 220 is configured to: after obtaining the first quality deterioration value, and before calculating the second quality deterioration value, determine a position of the damaged data in the first video frame; and correct the first quality deterioration value based on the position of the damaged data in the first video frame. Correspondingly, xle in a formula xl=β*xle*Δt is specifically the first quality deterioration value obtained after being corrected based on the position.

Specifically, the calculation unit 220 may correct the first quality deterioration value by using a formula xle12=α*xle11, where xle11 is a first quality deterioration value obtained before being corrected based on the position, xle12 is a first quality deterioration value obtained after being corrected based on the position, α is a correction factor and is used to represent a degree of impact of the position of the damaged data on quality of the first video frame, a value of α is greater than 0 and is less than or equal to 1, a smaller value of a indicates a lower impact degree, and a larger value of α indicates a higher impact degree.

The calculation unit 220 may calculate α by using the following formula:

$$\alpha = f(\text{damagePosition})$$

For a specific calculation manner of α, refer to step 103 of Embodiment 1 of the present invention. Details are not described again.

In a Third Implementation:

The calculation unit 220 is configured to obtain the first quality deterioration value by calculating a proportion of damaged data in the first video frame, where the damaged data includes image data affected by loss of the first data packet in the first video frame; and is further configured to: determine a position of the damaged data in the first video frame, and correct the first quality deterioration value based on the position of the damaged data in the first video frame.

Specifically, the first quality deterioration value may be corrected by using a formula xle12=α*xle11, where xle11 is a first quality deterioration value obtained before being corrected based on the position, xle12 is a first quality deterioration value obtained after being corrected based on the position, α is a correction factor and is used to represent a degree of impact of the position of the damaged data on quality of the first video frame, a value of α is greater than 0 and is less than or equal to 1, a smaller value of α indicates a lower impact degree, and a larger value of α indicates a higher impact degree.

The calculation unit 220 may calculate α by using the following formula:

$$\alpha = f(\text{damagePosition})$$

For a specific calculation manner of α, refer to step 103 of Embodiment 1 of the present invention. Details are not described again.

Further, the calculation unit 220 may be configured to: after obtaining the first quality deterioration value, and before correcting the first quality deterioration value based on the position of the damaged data in the first video frame, when it is determined that the first video frame is not a scene change frame, correct the first quality deterioration value based on a scene in which the first video frame is located. Specifically, the first quality deterioration value may be corrected by using a formula xlec=β*xlel, where xlel is a first quality deterioration value obtained before being corrected based on the scene, xlec is a first quality deterioration value obtained after being corrected based on the scene, β is used to represent scene complexity of the scene in which the first video frame is located, a value of β is greater than 0 and less than 1, a larger value of β indicates higher complexity of the scene, and a smaller value of β indicates lower complexity of the scene.

Correspondingly, the calculation unit 220 corrects, based on the position, the first quality deterioration value obtained after being corrected based on the scene complexity.

In addition, the calculation unit 220 may be further configured to: after correcting the first quality deterioration value based on the position, calculate the second quality deterioration value by using the following formula.

$$xl = \beta * xle * \Delta t$$

xle is the first quality deterioration value, xl is the second quality deterioration value, αt is a difference between a time point corresponding to the first video frame and a time point corresponding to a scene change frame that is located after the first video frame, that has a shortest distance to the first video frame, and that is in the GOP, β is used to represent scene complexity of the scene in which the first video frame is located, a value of β is greater than 0 and less than 1, a larger value of β indicates higher complexity of the scene, and a smaller value of β indicates lower complexity of the scene.

Function modules in Embodiment 2 of the present invention may be used to implement the method of the foregoing Embodiment 1.

According to the assessment apparatus 200 provided in Embodiment 2 of the present invention, during video quality assessment, the proportion of the damaged data caused by packet loss in the video frame in which the damaged data is located is considered, and other factors are also considered, such as the position of the damaged data in the video frame and impact of the scene complexity of the scene in which the video frame is located on the video frame or a video frame located after the video frame. Therefore, accuracy of quality assessment is higher.

Figure 6:
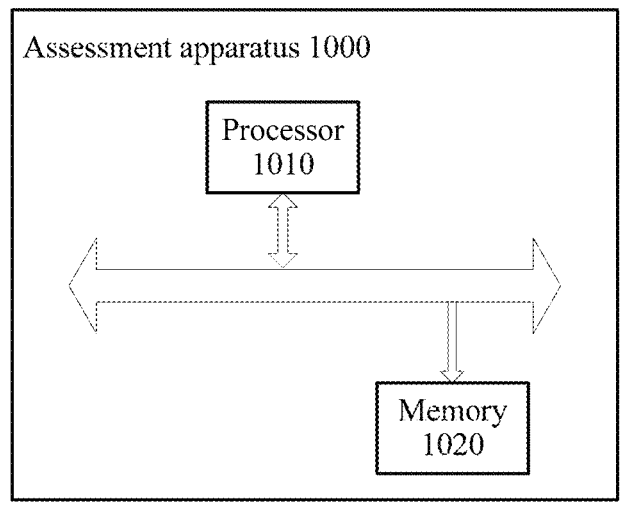
FIG. 6 is a schematic structural diagram of an assessment apparatus 1000 according to Embodiment 3 of the present invention.

Based on Embodiment 1 of the present invention, Embodiment 3 of the present invention provides an assessment apparatus 1000. As shown in FIG. 6, the assessment apparatus 1000 includes a processor 1010 and a memory 1020, where the processor 1010 and the memory 1020 complete mutual communication by using a bus.

The memory 1020 is configured to store a computer operation instruction. The memory 1020 may include a high-speed RAM memory, and may further include a non-volatile memory (non-volatile memory), for example, at least one magnetic disk memory.

The processor 1010 is configured to perform the computer operation instruction stored in the memory 1020. The processor 1010 may be specifically a central processing unit (CPU, central processing unit), which is a core unit of a computer.

The processor 1010 performs the computer operation instruction, and consequently, the assessment apparatus 1000 performs the method in the foregoing Embodiment 1.

According to the assessment apparatus 1000 provided in Embodiment 3 of the present invention, during video quality assessment, the proportion of the damaged data caused by packet loss in the video frame in which the damaged data is located is considered, and other factors are also considered, such as the position of the damaged data in the video frame and impact of the scene complexity of the scene in which the video frame is located on the video frame or a video frame located after the video frame. Therefore, accuracy of quality assessment is higher.

Figure 7:
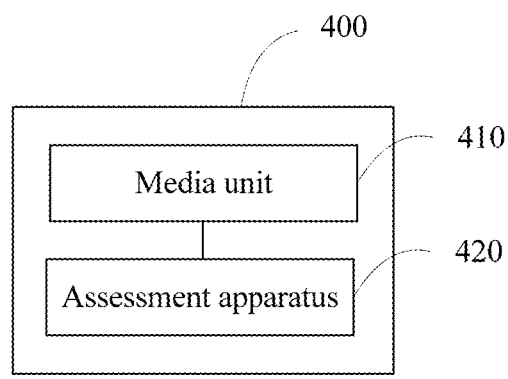
FIG. 7 is a schematic structural diagram of a transmission device 400 according to Embodiment 4 of the present invention.

Based on Embodiments 1 to 3 of the present invention, Embodiment 4 of the present invention provides a transmission device 400. As shown in FIG. 7, the transmission device 400 includes a media unit 4010 and an assessment apparatus 4020.

The media unit 4010 is configured to receive a media stream sent by a video server, send the media stream to another transmission device or video terminal, and transmit the media stream to the assessment apparatus 4020.

The assessment apparatus 4020 may be specifically the assessment apparatus 200 provided in Embodiment 2 or the assessment apparatus 1000 provided in Embodiment 3, and is configured to: obtain the media stream from the media unit 4010 and perform an operation that is performed by the assessment apparatus 200 provided in Embodiment 2 or the assessment apparatus 1000 provided in Embodiment 3. In a process of performing the operation, the assessment apparatus 4020 is specifically configured to determine, based on the media stream, that a first data packet in a plurality of data packets that are used to encapsulate a first video frame is lost.

Figure 8:
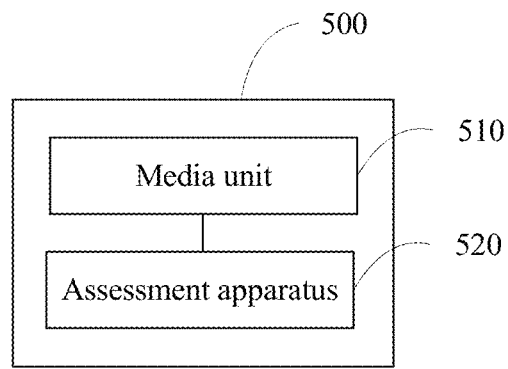
FIG. 8 is a schematic structural diagram of a video terminal 500 according to Embodiment 5 of the present invention.

Based on Embodiments 1 to 3 of the present invention, Embodiment 5 of the present invention provides a video terminal 500. As shown in FIG. 8, the transmission device 500 includes a media unit 5010 and an assessment apparatus 5020.

The media unit 5010 is configured to receive a media stream sent by a video server, decode and play the media stream, and transmit the media stream to the assessment apparatus 4020.

The assessment apparatus 5020 may be specifically the assessment apparatus 200 provided in Embodiment 2 or the assessment apparatus 1000 provided in Embodiment 3, and is configured to: obtain the media stream from the media unit 5010, perform an operation that is performed by the assessment apparatus 200 provided in Embodiment 2 or the assessment apparatus 1000 provided in Embodiment 3. In a process of performing the operation, the assessment apparatus 5020 is specifically configured to determine, based on the media stream, that a first data packet in a plurality of data packets that are used to encapsulate a first video frame is lost.

Figure 9A:
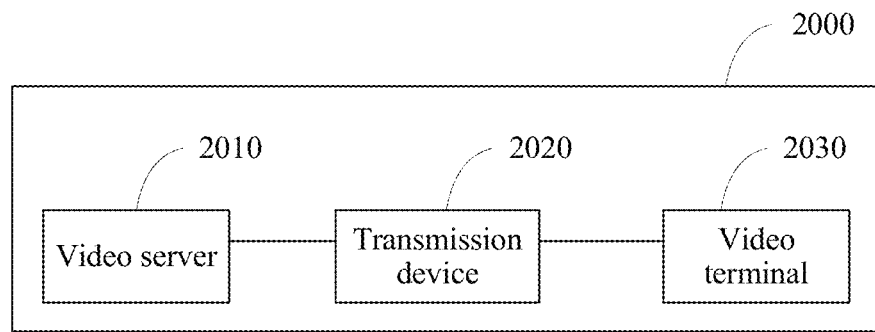
FIG. 9A-FIG. 9C are schematic structural diagrams of a system 2000 according to Embodiment 6 of the present invention.

Based on Embodiments 1 to 3 of the present invention, Embodiment 6 of the present invention provides a system 2000 for implementing video quality assessment. As shown in FIG. 9A, the system 2000 includes a video server 2010, a transmission device 2020, and a video terminal 2030. A video stream sent by the video server 2010 is transmitted to the video terminal 2030 by using the transmission device 2020.

In a specific implementation, the transmission device 2020 or the video terminal 2030 may specifically include the assessment apparatus 200 provided in Embodiment 2 or the assessment apparatus 1000 provided in Embodiment 3. In specific implementation, the transmission device 2020 and the video terminal 2030 each may include the assessment apparatus 200 provided in Embodiment 2 or the assessment apparatus 1000 provided in Embodiment 3. The transmission device 2020 may be specifically the transmission device 400 provided in Embodiment 4. The video terminal 2030 may be specifically the video terminal 500 provided in Embodiment 5.

Figure 9B:
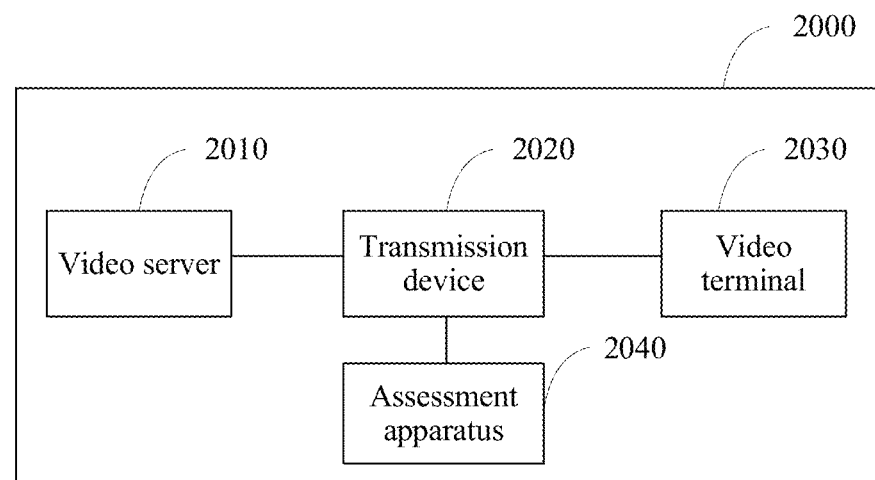
Figure 9C:
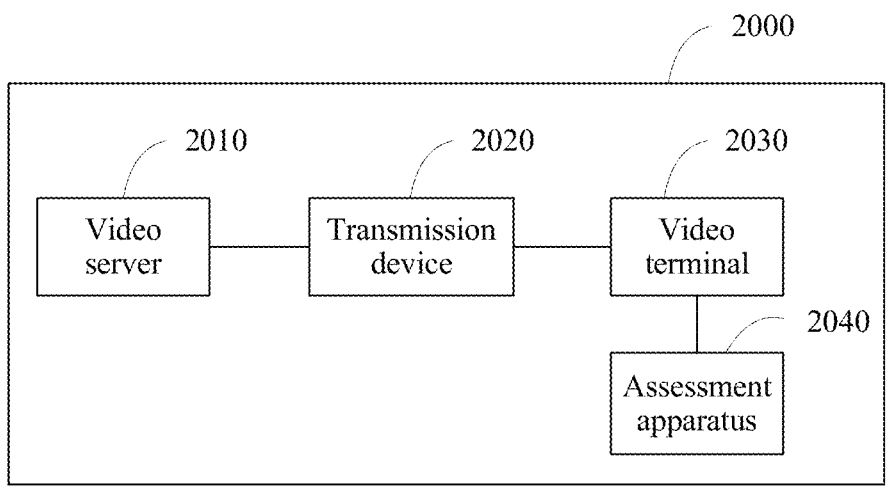

In another specific implementation, the system further includes an assessment apparatus 2040. As shown in FIG. 9B and FIG. 9C, the assessment apparatus 2040 may be specifically the assessment apparatus 200 provided in Embodiment 2 or the assessment apparatus 1000 provided in Embodiment 3. The transmission device 2020 or the video terminal 2030 is connected to the assessment apparatus 2040, and the assessment apparatus 2040 obtains the video stream by using the transmission device 2020 or the video terminal 2030 that is connected to the assessment apparatus 2040. In specific implementation, the transmission device 2020 and the video terminal 2030 may be respectively connected to an assessment apparatus 2040.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing video quality assessment, where the method includes:

determining that a first data packet in a plurality of data packets that are used to encapsulate a first video frame is lost;

obtaining a quality deterioration value of the first video frame by calculating a proportion of damaged data in the first video frame, where the damaged data includes image data affected by loss of the first data packet in the first video frame; and calculating, by using the following formula, a quality deterioration value of a GOP in which the first video frame is located:

$$xl = \beta * xle * \Delta t$$

where xle is the quality deterioration value of the first video frame, xl is the quality deterioration value of the GOP in which the first video frame is located, $\Delta t$ is a difference between a time point corresponding to the first video frame and a time point corresponding to a scene change frame that is located after the first video frame, that has a shortest distance to the first video frame, and that is in the GOP, β is used to represent scene complexity of the scene in which the first video frame is located, a value of β is greater than 0 and less than 1, a larger value of β indicates higher complexity of the scene, and a smaller value of β indicates lower complexity of the scene.

2. The method according to claim 1, where after the obtaining a quality deterioration value of the first video frame, and before the calculating a quality deterioration value of a GOP in which the first video frame is located, the method further includes:

determining a position of the damaged data in the first video frame; and correcting the quality deterioration value of the first video frame based on the position of the damaged data in the first video frame, where xle is specifically a quality deterioration value obtained after being corrected based on the position.

3. The method according to claim 2, where the correcting based on the position of the damaged data in the first video frame specifically includes:

correcting the quality deterioration value of the first video frame by using a formula xlel2=α*xlel1, where xlel1 is a quality deterioration value obtained before being corrected based on the position, xlel2 is a quality deterioration value obtained after being corrected based on the position, α is a correction factor and is used to represent a degree of impact of the position of the damaged data on quality of the first video frame, a value of α is greater than 0 and is less than or equal to 1, a smaller value of α indicates a lower impact degree, and a larger value of α indicates a higher impact degree.

4. An assessment apparatus comprising:
a processor; and
a non-transitory computer readable medium which contains computer-executable instructions;
the processor is configured to execute the computer-executable instructions to perform operations comprising:
determining that a first data packet in a plurality of data packets that are used to encapsulate a first video frame is lost;
obtaining a quality deterioration value of the first video frame by calculating a proportion of damaged data in the first video frame, where the damaged data includes image data affected by loss of the first data packet in the first video frame; and
calculating, by using the following formula, a quality deterioration value of a GOP in which the first video frame is located:

$xl = \beta * xle * \Delta t$ where xle is the quality deterioration value of the first video frame, xl is the quality deterioration value of the GOP in which the first video frame is located, Δt is a difference between a time point corresponding to the first video frame and a time point corresponding to a scene change frame that is located after the first video frame, that has a shortest distance to the first video frame, and that is in the GOP, β is used to represent scene complexity of the scene in which the first video frame is located, a value of β is greater than 0 and less than 1, a larger value of β indicates higher complexity of the scene, and a smaller value of β indicates lower complexity of the scene.

5. The assessment apparatus according to claim 4, where after the obtaining a quality deterioration value of the first video frame, and before the calculating a quality deterioration value of a GOP in which the first video frame is located, the processor is further configured to execute the computer-executable instructions to perform an operation comprising:

determining a position of the damaged data in the first video frame; and correcting the quality deterioration value of the first video frame based on the position of the damaged data in the first video frame, where xle is specifically a quality deterioration value obtained after being corrected based on the position.

6. The assessment apparatus according to claim 5, where the correcting based on the position of the damaged data in the first video frame specifically includes:

correcting the quality deterioration value of the first video frame by using a formula xlel2=α*xlel1, where xlel1 is a quality deterioration value obtained before being corrected based on the position, xlel2 is a quality deterioration value obtained after being corrected based on the position, α is a correction factor and is used to represent a degree of impact of the position of the damaged data on quality of the first video frame, a value of α is greater than 0 and is less than or equal to 1, a smaller value of a indicates a lower impact degree, and a larger value of α indicates a higher impact degree.

* * * * *